United States Patent [19]

Padley et al.

[11] Patent Number: 5,104,680
[45] Date of Patent: Apr. 14, 1992

[54] CHOCOLATE CONFECTIONERY AND HARD FAT EMULSION CONTAINED THEREIN

[75] Inventors: Frederick B. Padley, Bedford; Geoffrey Talbot, Kempston, both of Great Britain

[73] Assignee: Van den Bergh Foods Co., Division of Conopco, Inc., Lisle, Ill.

[21] Appl. No.: 521,800

[22] Filed: May 10, 1990

[30] Foreign Application Priority Data

May 11, 1989 [GB] United Kingdom ............... 8910868
Jul. 13, 1989 [GB] United Kingdom ............... 8916092

[51] Int. Cl.$^5$ .................................. A23D 7/00
[52] U.S. Cl. .................................. 426/602; 426/572; 426/606; 426/607; 426/613; 426/631; 426/659
[58] Field of Search ............... 426/606, 607, 572, 602, 426/613, 659, 631

[56] References Cited

U.S. PATENT DOCUMENTS

| | | | |
|---|---|---|---|
| 3,223,532 | 12/1965 | Pinkalla et al. | 426/602 |
| 3,658,555 | 4/1972 | Menz et al. | 426/607 |
| 3,889,004 | 6/1975 | Schmidt et al. | 426/506 |
| 4,273,795 | 6/1981 | Bosco et al. | 426/602 |
| 4,368,213 | 1/1983 | Hollenbach et al. | 426/602 |
| 4,410,552 | 10/1983 | Gaffney et al. | 426/572 |
| 4,464,411 | 8/1984 | Herzing et al. | 426/613 |
| 4,865,866 | 9/1989 | Moore | 426/602 |

FOREIGN PATENT DOCUMENTS

| | | | |
|---|---|---|---|
| 0165720 | 12/1985 | European Pat. Off. | 426/613 |
| 2609998 | 9/1977 | Fed. Rep. of Germany | 426/659 |
| 0150539 | 9/1981 | Fed. Rep. of Germany | 426/605 |
| 1577933 | 10/1980 | United Kingdom . | |

*Primary Examiner*—Donald E. Czaja
*Assistant Examiner*—Jean L. Aberle
*Attorney, Agent, or Firm*—Rimma Mitelman

[57] ABSTRACT

Compositions, suitable for chocolate filling, comprising a water in hard fat emulsion, wherein the particle size of the dispersed water phase is at most 50 μm, are obtained by a process in which a melt of the hard fat is dispersed in an aqueous phase, after which a phase inversion is effected and the water in hard fat emulsion is obtained.

12 Claims, No Drawings

CHOCOLATE CONFECTIONERY AND HARD FAT EMULSION CONTAINED THEREIN

This invention relates to chocolate confectionery compositions and in particular to chocolate fillings containing fat compositions.

Chocolate confectionery includes much of the sugar confectionery covered in chocolate, for example chocolate fillings. Chocolate confectionery containing fat compositions frequently include aqueous components including water-soluble flavouring agents in addition to sugar. The latter is present not only for its sweetening effect but also to provide adequate microbiological stability. The increasing emphasis on healthier eating provides a demand for chocolate confectionery with a lower calorific content. The present invention provides chocolate confectionery suitable for chocolate fillings meeting this demand. The present invention therefore provides confectionery compositions suitable for chocolate fillings comprising hard fat in which an aqueous phase is dispersed having a droplet size not exceeding 50 microns, preferably 35 microns or less and more preferably not exceeding 10 microns, and preferably including flavouring agents and sugar.

The hard fat emulsions of the compositions of the present invention exhibit a hardness or C-value of at least 1600 at 20° C. Hardness determined by C-values are measured in accordance with the method described by Haighton et al, JAOCS, 36, 345 (1959) using a cone angle at 40° with a weight of 240 grams. The water-in-fat emulsion comprising the invention may be prepared in a manner conventional for margarine and other plastified water-in-fat emulsion products, as for example by churning or by processing in scraped-surface heat exchanger units for example Votator units, in which an emulsion of fully melted fat and aqueous phase is chilled and worked to provide a matrix of fat crystals in which the aqueous phase is dispersed, an emulsifier suitable for the purpose being present in the composition. Water-soluble ingredients are preferably dissolved or dispersed in the aqueous phase before the emulsion is prepared. Preferably the initial emulsion of liquefied fat and aqueous phase is in the form of a cream i.e. a dispersion of liquid fat in the aqueous phase, conditions being selected during the chilling and working stages of the process to effect inversion of the composition to a water-in-fat dispersed product. By appropriate choice of emulsifier, the product retains an inherent propensity to revert by phase inversion at body temperature, providing a continuous aqueous phase affording more immediate response to the flavour components in the aqueous phase when the product is consumed.

Suitable emulsifiers for promoting this phase inversion effect include mixtures of partially hydrolysed lipids and phospholipids, particularly mixtures of those derived from palm oil by hydrolysis and lysolecithin products, for example those marketed under the tradename Bolec. These emulsifier systems are particularly effective in the presence in the aqueous phase of milk proteins and are preferably used in substantially equal amounts by weight, providing a total emulsified concentration from 0.1 to 1% of the total product composition, more especially from 0.1 to 0.5%. Those familiar with margarine and related technology will understand that the phase inversion during processing of the initial cream emulsion may also require a processing regime which includes a higher energy input. This may be provided by running two or more scraped-surface heat exchanger units in series with scraped-surface crystalliser units.

It will be appreciated that in pursuit of lower calorific content, the amount of fat in the emulsion composition may be substantially less than occurs for instance in butter and preferably the fat content is from 20 to 50%, especially 30 to 40% by weight of the total composition.

Suitable fats for use in the preparation of the product of the invention preferably comprise or are derived from vegetable butters, particularly those rich in 2-oleyl triglycerides of palmitic and/or stearic acids. These triglycerides confer in such fats as cocoa butter, illipe, shea, palm and sal fats, including cocoa butter equivalent replacement compositions prepared from them, the sharp melting characteristics for which they are highly prized, ranging from a hard fat with good snap and resistance to finger printing at temperature ambient conditions, to a wholly melted consistency at body temperature.

Stearing i.e. upper-melting or intermediate fractions of such fats may also be adopted, particularly cocoa butter stearins and palm mid-fractions, as may selectively hardened fats and oils, particularly vegetable oils e.g. sunflower, cottonseed and groundnut oils, their fractions and fats derived from them, and also synthesised and rearranged fats, in particular those obtained by 1, 3-selective enzyme rearrangement as described in British Patent 1,577,933.

Other additives that may be included in the compositions of the invention comprise stabilisers for inhibiting microbiological spoilage, whether by stabilising the emulsion or by the use of thickening agents for example edible gum e.g. locust bean, carob or gelatin, or by maintaining a sufficiently low pH, i.e. not more than 5.5, preferably from about 4.5 to about 5.0, to inhibit bacterial growth. Thickening agents are preferably present in an amount from 1 to 10% and acidifying agents for example sorbates which inhibit surface mould growth, in an amount from 0.01 to 1%.

Where the composition comprises surface active ingredients such as cocoa non-fat solids, care should be taken to minimise the destabilising effect these substances may have on the fat continuous emulsion. In particular, where cocoa non fat solids are employed the content on product of this substance should preferably be below 8% if conventional emulsifiers are used. As is apparent to the skilled man, the use of specialised emulsifier systems and/or alternative processing techniques would enable higher levels of such solids to be used.

Suitable sweetening agents include sugars and low-calorie sweetening agents for example aspartame and these together with other water-soluble additives are preferably first dissolved in the aqueous phase before preparation of the emulsion from which the products of the invention are prepared. Flavouring agents e.g. cocoa powder, fruit or coffee flavouring and similar ingredients, for example honey, praline and nut paste generally or alcoholic components may be included in the aqueous or fat phases beforehand, according to their solubility.

The confectionery compositions of the invention may be enrobed with chocolate or other confectionery coating, preferably after applying an impervious edible shell for example shellac or hard fat to inhibit migration to the surface of the coating with the onset of bloom.

EXAMPLE 1

Chocolate fillings were made according to the recipes in Table 1.

TABLE I

| FORMULATIONS | SAMPLE NO. HARDNESS 5° C. 20° C. | 1 5860 1770 | 2 7045 1870 | 3 9365 4220 |
| --- | --- | --- | --- | --- |
| Gelatin | | 3.0 | 3.0 | 4.17 |
| Skim milk powder | | 1.0 | 1.0 | 1.0 |
| Salt | | 1.0 | 1.0 | 1.0 |
| Sorbate | | 0.08 | 0.08 | 0.08 |
| Water | | 54.92 | 54.92 | 43.75 |
| Fat* | | 37.6 | 39.59 | 47.0 |
| Sun flower oil | | 1.99 | — | 2.59 |
| Mono-glyceride | | 0.2 | 0.2 | 0.2 |
| Bolec Z | | 0.2 | 0.2 | 0.2 |
| Colour | | 0.01 | 0.01 | 0.01 |

*(40% Palm oil, 60% Palm mid-fraction IV 34; $SFI_{20}$ = 83.1; $SFI_{35}$ = 0.5, from saturated palm oil)

The soluble ingredients were dissolved in the water component and the remaining additives including colour in the fat. The resulting fat phase was dispersed at 60° C. in the aqueous phase to form a water-continuous cream which was processed through a unit line consisting of scraped-surface heat exchangers (A units) with scraped surface crystallisers (C units) arranged in series as shown in Table 2. All the rotors were operated at a 1000 rpm except C2 which was at 1300 rpm. Temperatures measured at the exit from each unit were as given in Table 2.

TABLE 2

| Sample no | C1 | A1 | C2 | A2 | C3 |
| --- | --- | --- | --- | --- | --- |
| 1 | 28.1 DEG.C. | 18.8 | 19.1 | — | 19.3 |
| 2 | 28.1 DEG.C. | 20.3 | — | 18.9 | 21.3 |
| 3 | 26.9 | 16.5 | 19.0 | 16.2 | 18.4 |

The resulting product showed a particle size for the aqueous phase of 15–18 μm and exhibited excellent stability on storage. Samples blended with 30% sugar were made up by coating 5 g batches first with shellac, barrier fat or barrier fat/sugar and then by enrobing with chocolate. The resulting products showed excellent stability after storage and produced a pleasing oral response.

EXAMPLE 2

A chocolate filling was prepared by emulsifying an aqueous phase in a fat phase as described in Example I. The composition of each was as follows:

| | Wt % total composition |
| --- | --- |
| Aqueous phase | |
| Water | 59.05 |
| Potassium sorbate | 0.13 |
| Aspartame | 0.02 |
| Citric acid | to pH 4.5 |
| | 60.0 |
| Butter oil | 20 |
| Palm mid-fraction | 13.45 |
| Margarine fat | 5.9 |
| Monoglyceride emulsifier (Hymono 4404) | 0.6 |
| Carotene | 0.05 |
| | 40.00 |

The emulsion with a droplet size of the water of 5–10μm was prepared at 60° C. via a proportioning pump and processed successively through Votator C and A units jacketed at 5° C. and operating at 1000 r.p.m., providing product exit temperatures of 18.8°, 13.4°, 15.1°, 12.2° and 11.6° C. After resting and cooling the product from the final C unit was chocolate—enrobed and exhibited excellent microbiological stability and received good consumer response.

EXAMPLE 3

Chocolate confections were made according to the recipes given in table 3 below.

TABLE 3

| Gelatine | 4.0% |
| --- | --- |
| Cocoa powder | 4.0% |
| Vanillin | 0.02% |
| Admul WOL | 0.03% |
| Fat (cocoa butter) | 30.0% |
| Water | to 100% |

Soluble components were dissolved in water in which cocoa powder was dispersed. This aqueous phase was loaded into a premix tank at 45° C. Separately, the fatty phase was melted and loaded into a pre-mix vessel at 45° C.

Fatty phase was drawn from the fat-containing premix tank by means of a proportioning pump and fed through a jacketed A-unit turning at 500 rpm. The exit temperature of the A-unit was 30° C. This fatty phase was mixed in line with the aqueous phase and fed into a C-unit turning at 1700 rpm. the exit temperature of the C-unit was 32° C. The product was discharged from the C-unit into moulds and allowed to cool.

The product obtained was too hard to be able to measure a C-value and had a snap similar to chocolate and a pleasing oral response, but can be seen to have 40% less calories than a conventional chocolate.

What is claimed is:

1. Confectionery compositions suitable for chocolate fillings comprising a hard fat emulsion having a C-value according to Haighton of at least 1600 ° at 20° C. and comprising a vegetable butter rich in 2-oleyl triglycerides of palmitic and/or stearic acid, wherein an aqueous phase having a droplet size not exceeding 50 microns is present in the emulsion as the dispersed phase and wherein the hard fat content of the emulsion is from 20 to 50% by weight of the total composition.

2. Composition according to claim 1 wherein the vegetable butter comprises cocoa butter, illipe, shea palm or sal fat.

3. Composition according to claim 1 wherein the hard fat comprises an enzyme rearranged fat.

4. Composition according to claim 1 wherein the hard fat comprises a selectively hardened fat or vegetable oil.

5. Composition according to claim 1 wherein the hard fat comprises an upper-melting or intermediate fraction of the fat.

6. Composition according to claim 1 in which a stabilising amount of edible gum is present to inhibit microbiological spoilage.

7. Composition according to claim 1 in which the pH of the aqueous phase is below pH 5.5.

8. Composition according to claim 1 in which an emulsifier is present comprising a mixture of partially hydrolysed lipids and phospholipids.

9. Composition according to claim 1 in which milk proteins are present.

10. Composition according to claim 1 wherein the aqueous phase contains a sweetening agent.

11. Composition according to claim 1 which further comprises cocoa non-fat solids.

12. A chocolate coated composition which contains as a filling a composition according to claim 1.

* * * * *